R. H. RICE.
PULSATION PREVENTING MECHANISM FOR CENTRIFUGAL COMPRESSORS.
APPLICATION FILED FEB. 2, 1917.
1,280,843.
Patented Oct. 8, 1918.
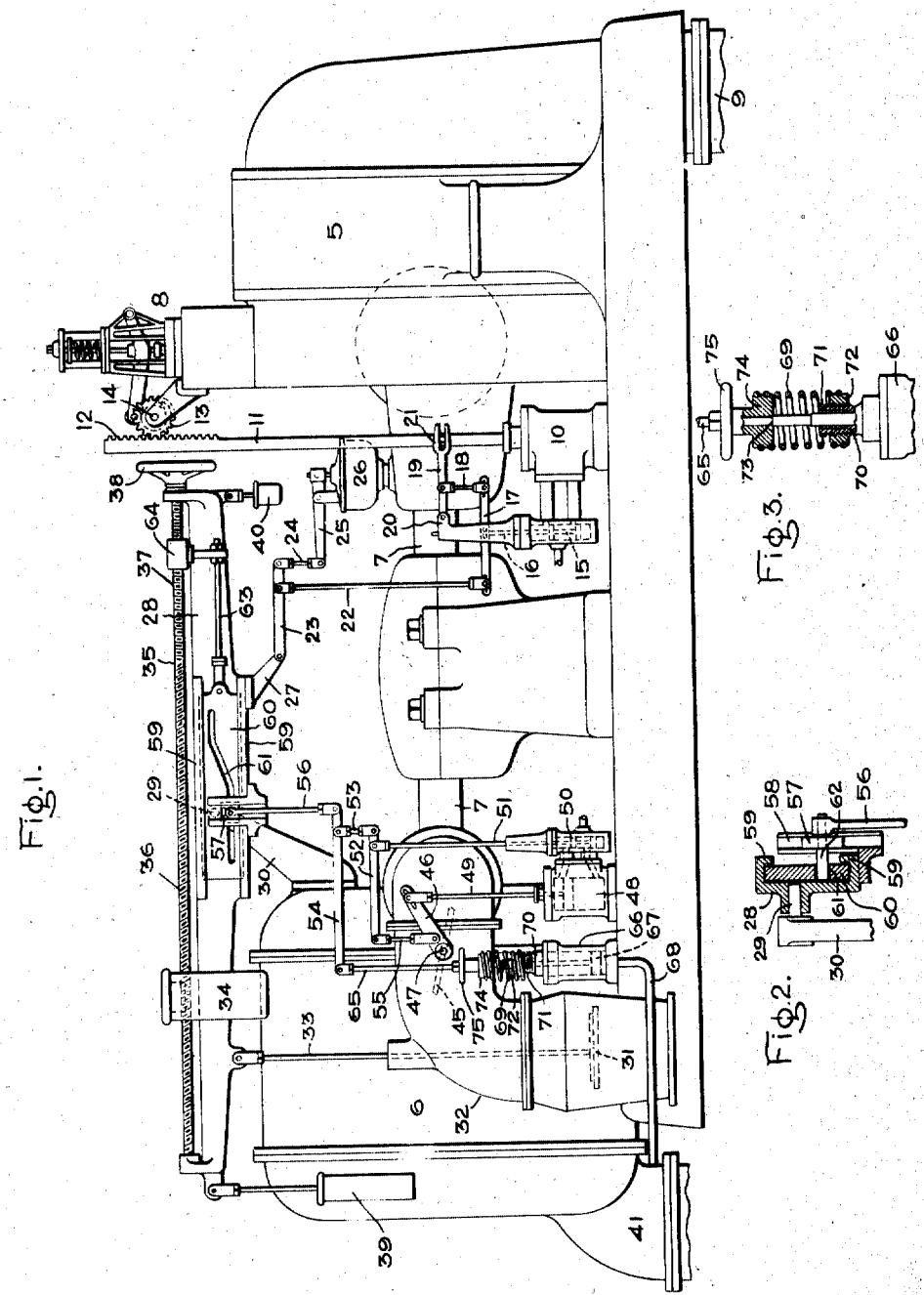
Inventor:
Richard H. Rice,
by Albert G. Davis
His Attorney.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

PULSATION-PREVENTING MECHANISM FOR CENTRIFUGAL COMPRESSORS.

1,280,843.                Specification of Letters Patent.        Patented Oct. 8, 1918.

Application filed February 2, 1917.  Serial No. 146,085.

*To all whom it may concern:*

Be it known that I, RICHARD H. RICE, a citizen of the United States, residing at Lynn, in the county of Essex, State of Massachusetts, have invented certain new and useful Improvements in Pulsation-Preventing Mechanism for Centrifugal Compressors, of which the following is a specification.

The present invention relates to centrifugal compressors, such as are used for compressing air or other gases, and has for its object to provide an improved apparatus for preventing the pulsations of the column of air or other gas flowing through the machine. In the following specification the compressor is described as a machine for handling air, but it will be understood that my invention is not limited to this use.

Pulsations in a centrifugal compressor are found to occur under certain conditions of light load, and it is known that they may be prevented by throttling the intake of the compressor, or by wasting air from the discharge side of the compressor, as by letting it discharge to atmosphere or by-passing it to the inlet.

I have found that the point at which pulsations occur in any machine depends upon the volume of air which the machine is handling and the pressure of the discharge. In other words, for every volume there is a critical discharge pressure above which pulsations are liable to occur, and vice versa for every discharge pressure there is a critical volume below which pulsations are liable to occur. The critical pressures and volumes in different machines vary considerably, however, and for any particular machine they can only be determined by experiment.

According to my present invention I provide a suitable valve, which I term a pulsation preventing valve, and which may be placed in the compressor inlet or in a by-pass leading from the discharge side of the machine, and I actuate, regulate or set this pulsation preventing valve in accordance with the volume which the machine is handling and the discharge pressure.

For certain uses centrifugal compressors are equipped with constant volume governors which operate to keep a constant volume of air per unit of time passing through the machine, and in the following specification and drawing I have specifically disclosed my invention as applied to such a machine.

For a consideration of what I believe to be novel and my invention, attention is directed to the accompanying specification and the claims appended thereto.

In the accompanying drawings, Figure 1 is a diagrammatic view in side elevation of a turbo-compressor set provided with a pulsation preventing mechanism embodying my invention, and Figs. 2 and 3 are sectional views of certain details.

Referring to the drawing, 5 indicates an elastic fluid turbine and 6 a centrifugal compressor driven thereby, the rotors of both being on the shaft 7. 8 indicates a valve mechanism which controls the admission of elastic fluid to the turbine and which may be of any suitable type, an ordinary and well known form being shown for the purpose of illustration. The exhaust conduit of the turbine is shown at 9. The valve mechanism 8 is moved by the fluid actuated motor 10, the stem 11 of which has a rack 12 engaging a gear wheel 13 on the cam shaft 14 of the valve mechanism. 15 indicates the pilot valve of the fluid motor 10 having its stem 16 connected to a floating lever 17. One end of lever 17 is connected by a link 18 to a lever arm 19 pivoted at one end to a fixed support 20 and connected at the other end to the stem 11 by a suitable connection comprising a slot and pin as indicated at 21. The other end of lever 17 is connected by a rod 22 to a floating lever 23, one end of which is connected by a link 24 to the governor lever 25 of a speed governor 26 driven from the shaft 7. The other end of floating lever 23 is pivoted on the end of a short arm 27 fixed to the beam 28 of a constant volume governing mechanism. The beam 28 is pivoted at 29 on a support 30 and is adapted to be tilted by a float 31 located in the intake conduit 32 of the compressor and connected to the beam by a rod 33. The float 31 rides on the air entering the compressor and its action is balanced by a weight 34 which is termed the constant volume governor weight. Journaled on the beam is a rod 35 having threaded portions 36 and 37 and a hand wheel 38 by which it may be turned. The weight 34 has a threaded portion which engages the threaded portion 36 of rod 35 so that by turning the hand wheel the weight may be adjusted along the beam 28. 39 indicates a dash pot for steadying the movements of the beam and 40 a balancing weight. 41 indicates the exhaust conduit of the compressor.

The arrangement so far described comprises a well known type of constant volume governing mechanism for a turbine driven compressor, the operation of which will now be briefly described.

The constant volume governor weight 34 is set on the beam 28 for the flow of fluid desired. For this purpose a suitable scale or other means (not shown) is provided to guide the attendant. The float 31 acts on the beam 28 to tilt it so as to cause the fluid motor 10 to open and close the valve mechanism 8, which in turn admits more or less fluid to the turbine and thereby causes such regulation in the speed of the turbine as to obtain sufficient air discharge pressure for the compressor as is required to force the proper quantity or volume of air through the discharge conduit of the compressor. If the sliding weight 34 is set for a certain volume of air and less air flows past the float 31, the float lowers a little, thus tilting the beam 28 in an anti-clockwise direction. This lifts the end of lever 23 which is attached to arm 27, the link 24 acting as the fulcrum. The rod 22 is thus lifted and through lever 17 lifts the pilot valve 15 so that the fluid motor 10 acts to open the valve mechanism 8 to admit more elastic fluid to the turbine, causing an increase in the speed of the turbine and compressor. Increase of speed of the compressor raises the pressure of the discharged air and also the volume delivered and therefore more air passes by the float 31 tending to raise the same and place it in the correct position for the volume of air desired. On the other hand, if the volume tends to increase then the float will raise and tilt the beam in the opposite direction. This motion will begin to close off the elastic fluid supplied to the turbine as already explained until the unit will have reached a proper reduced speed for the volume of air desired. The speed governor 26 is normally inactive, the turbine being wholly under the control of the constant volume governor and only comes into play to take control in case of excess speed. In other words, it is somewhat of the nature of an emergency governor.

Referring now to the application of my improved pulsation preventing mechanism to a turbo-compressor set as just described. 45 indicates a valve arranged in the inlet conduit 32 and having an operating arm 46 connected to valve spindle 47. This is a pulsation preventing valve and is operated to throttle the intake in order to prevent pulsations under certain conditions of load. The arm 46 is moved by a fluid operated motor 48, the stem 49 of which is connected to arm 46. 50 indicates the pilot valve of the motor 48. The stem 51 of the pilot valve is connected to a lever 52, one end of which is connected by a link 53 to a floating lever 54 and the other end by a link 55 to the arm 46. One end of lever 54 is connected to one end of a rod 56, the other end of which is pivoted to a block 57 which slides in guide-ways 58 on the beam 28. The guides 58 are in vertical alinement with the pivot point 29 so that the tilting of the beam 28 does not affect the position of the floating lever 54. On the beam 28 is a pair of longitudinally extending guides 59 in which slides a plate 60 having a cam slot 61 therein. Projecting into the cam slot 61 is a short pin 62 carried by the block 57, (see Fig. 2). The plate 60 is connected by a rod 63 to a nut 64 which engages the threaded portion 37 of the rod 35. By this arrangement it will be seen that when the hand wheel 38 is turned to set the constant volume governor weight 34 the nut 64 will also be adjusted along the threads 37 to move the plate 60. The other end of floating lever 54 is connected to the stem 65 of a pressure responsive device here shown as a cylinder 66 in which moves a piston 67. The cylinder 66 below piston 67 is connected by conduit 68 to the discharge conduit 41 of the compressor. The piston 67 is thus subjected to the pressure on the discharge side of the compressor. 69 is a spring which opposes the movement of the piston 67. Referring particularly to Fig. 3. 70 is a sleeve on the top of the cylinder 66 through which the stem 65 freely passes. The sleeve has a threaded portion 71 on which screws a nut 72. On the stem 65, spaced a short distance from the sleeve 70, is a shoulder 73 against which rests a member 74 to which is fixed a hand wheel 75. One end of the spring 69 is fixed to the nut 72 and the other end is fixed to the member 74. The nut 72 is normally stationary while the member 74 moves with the stem 65. It will thus be seen that the piston 67 moves against the tension of the spring 69. The tension of the spring may be adjusted by turning the hand wheel 75 which serves to turn the member 74, spring 69, and nut 72, thus running the nut up or down the thread 71 as the case may be.

As already stated the pulsation preventing valve 45, if it is to prevent pulsations, must be set in accordance with the volume which the compressor is delivering and the discharge pressure. In the mechanism illustrated the volume which the compressor is handling remains constant, or substantially constant, owing to the constant volume governing mechanism so that for any given setting of the constant volume governor weight there is a corresponding setting of the actuating mechanism for the pulsation preventing valve 45. When the weight 34 is set by turning the hand wheel 38 the block 57 is simultaneously moved in the guides 58 due to the pin 62 engaging the cam slot 61 in plate 60, to set the actuating mechanism for the pulsation preventing valve 45 in accordance with the volume for which weight 34 is set. Assume, for example, that the hand wheel 38 is turned in a direction to adjust the weight 34 toward the right. This will act to simultaneously move the nut 64 and plate 60 toward the left. The cam slot 61 will slide along pin 62 and raise the block 57 a certain amount. This will lift the right-hand end of floating lever 54 which will fulcrum on the stem 65, and through link 53 and stem 51 will lift the pilot valve 50 admitting motive fluid above the piston of the motor 48 causing it to lower slightly, thereby moving or tending to move the valve 45 toward closed position. When the valve 45 moves toward closed position, the pilot valve is brought back to its normal position through the connection comprising link 55 and lever 52, these parts acting as a usual form of follow-up device. This sets the pulsation preventing valve, or, in other words, the operating mechanism for the valve, to a position which bears a certain relation to the volume for which the constant volume governing mechanism is set. If now the delivery pressure of the compressor becomes of such a value that, for the volume being delivered, pulsations are likely to occur, or are about to occur, then the pressure acting through the conduit 68 on the piston 67 moves it slightly against the tension of spring 69. This tilts the floating lever 54 on the end of rod 56 as a pivot, thereby lifting the pilot valve 50 which, in the manner just described, tends to close to a greater or less extent the pulsation preventing valve 45. It will thus be seen that the valve 45 is set at any particular instant in accordance with both the volume and the delivery pressure.

It will be understood, of course, that it is desirable to throttle the intake only when necessary, as such throttling means, of course, a slight loss in efficiency, and cam 61 is so shaped, and the pressure responsive device 66, 67, is so adjusted, that, until a condition of volume and pressure is reached at which pulsations are likely to occur, the valve 45 will be entirely open. In other words, it is only when a certain relation of volume to pressure obtains that the pulsation preventing valve is operated.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with a centrifugal compressor having a constant volume governor, of a pulsation preventing valve mechanism, and means for setting it simultaneously with the setting of the constant volume governor.

2. The combination with a centrifugal compressor having a constant volume governor comprising a governor weight and means for adjusting it, of a pulsation preventing valve mechanism which is actuated in accordance with the pressure on the delivery side of the compressor, and means for modifying the effective action of such pressure on the valve mechanism in accordance with the volume for which the volume governor is set.

3. The combination with a centrifugal compressor having a constant volume governor comprising a governor weight and means for adjusting it, of a pulsation preventing valve mechanism which is actuated by the pressure of the fluid on the delivery side of the machine, and means for modifying the effective action of such pressure on the valve mechanism in accordance with the setting of the constant volume governor weight.

4. The combination with a centrifugal compressor having a constant volume governor comprising a pivoted beam and a weight adjustable thereon, of a pulsation preventing valve mechanism, means responsive to the pressure on the delivery side of the compressor for positioning said valve mechanism, and means including a member slidable on the beam and having a cam surface for also positioning said valve mechanism, said last named means being positioned in accordance with the volume of fluid entering the compressor.

5. The combination with a centrifugal compressor having a constant volume governor comprising a pivoted beam, a weight thereon, and means for adjusting the weight, of a pulsation preventing valve located in the intake of the compressor, mechanism for moving said valve, a movable abutment responsive to the pressure on the delivery side of the compressor for actuating said mechanism, and a plate having a cam slot therein for also actuating said mechanism, said plate being operatively connected to said weight adjusting means so as to be moved simultaneously therewith.

6. The combination with a centrifugal compressor having a constant volume governor comprising a pivoted beam, a weight thereon, and means for adjusting the weight, of a pulsation preventing valve located in the intake of the compressor, mechanism for moving said valve, a movable abutment responsive to the pressure on the delivery side of the compressor for actuating said mechanism, and a plate having a cam slot therein for also actuating said mechanism, said plate being located on the beam and operatively connected to said weight adjusting means so as to be moved simultaneously therewith.

In witness whereof, I have hereunto set my hand this 30th day of January, 1917.

RICHARD H. RICE.